June 13, 1961 JINJI KUMAGAI 2,988,603

AUTOMATIC TELEPHONE DIALING SYSTEM

Filed Jan. 2, 1959 4 Sheets-Sheet 1

INVENTOR.
JINJI KUMAGAI
BY Arlington C. White
ATTORNEY.

June 13, 1961 JINJI KUMAGAI 2,988,603

AUTOMATIC TELEPHONE DIALING SYSTEM

Filed Jan. 2, 1959

4 Sheets-Sheet 2

INVENTOR.

JINJI KUMAGAI

BY Arlington C. White

ATTORNEY.

INVENTOR.
JINJI KUMAGAI
BY Arlington C. White
ATTORNEY.

June 13, 1961 JINJI KUMAGAI 2,988,603

AUTOMATIC TELEPHONE DIALING SYSTEM

Filed Jan. 2, 1959 4 Sheets-Sheet 4

INVENTOR.
JINJI KUMAGAI
BY Arlington C. White
ATTORNEY

United States Patent Office 2,988,603

Patented June 13, 1961

2,988,603

AUTOMATIC TELEPHONE DIALING SYSTEM

Jinji Kumagai, 1725 Turk St., San Francisco, Calif.

Filed Jan. 2, 1959, Ser. No. 788,008
7 Claims. (Cl. 179—90)

The invention, in general, relates to telephone dialing systems and more particularly relates to a system associated with the standard dialing circuit of a conventional telephone of the dial type whereby the telephone number of any one of a plurality of subscribers' telephone numbers can be automatically dialed by the actuation of a single lever.

Heretofore in the art, there have been devised various mechanisms for effecting the automatic dialing of telephone numbers on a dial telephone instrument. One of these prior mechanisms includes a somewhat complex arrangement of code rods of electrically conductive material; each of the rods having spaced insulation pieces along the length thereof representing different telephone numbers, together with solenoids for depressing the rods and holding the same depressed, as well as means for advancing a conductor along each rod to engage the same when in a depressed position and to make contact with the various contact portions of the rod thereby to close the telephone circuit and complete the dialing of a telephone number. Another prior system and mechanism includes a finger-like member insertable into the finger openings of the telephone dial or finger wheel of a convenitonal dial telephone instrument, together with means to revolve and control the revolving movement of the finger member to accomplish the dialing of selected telephone numbers; such system requiring an endless tape having perforate codes representing telephone numbers, together with means for advancing the tape and for controlling the operation of the finger member in relation to the coded perforations in the tape. The foregoing, as well as other mechanisms of this type, are relatively complex requiring an undue number of coacting parts, and are relatively expensive to manufacture and to maintain. The present invention is directed to the provision of a relatively inexpensive device containing a minimum number of parts which can accomplish the automatic dialing of telephone numbers with facility and which obviates all of the disadvantages inherent in prior mechanisms for automatic telephone dialing.

A primary object of my invention is to provide an improved automatic telephone dialing system which is positive in action; which is readily installed in association with a conventional dial telephone instrument; and which requires but a minimum of parts and is compactly arranged to reduce space requirements.

Another important object of the present invention is to provide an improved automatic telephone dialing system of the indicated nature which is additionally characterized by its capability of effecting the dialing of any given telephone number automatically with facility and by the throwing of a single lever.

A still further object of my present invention is to provide an automatic telephone dialing system of the aforementioned character which is relatively inexpensive to produce and to operate, and which is so simple in its manipulation and selection of numbers for dialing that it can readily be employed by any unskilled operator.

Other objects of the invention, together with some of the advantageous features thereof, will appear from the following description of a preferred and a modified embodiment of the invention which is illustrated in the accompanying drawings. It is to be understood, however, that I am not to be limited to the precise embodiments shown, nor to the precise arrangement of the various parts thereof, as my invention, as defined in the appended claims can be embodied in a plurality and variety of forms.

Referring to the drawings.

Figure 7:
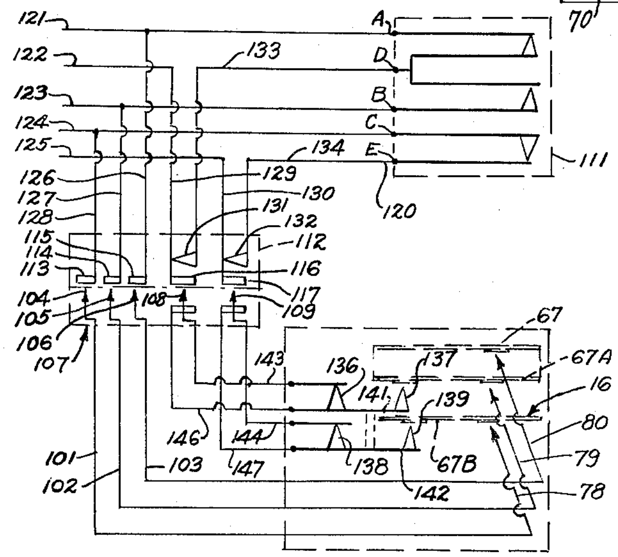

FIG. 7 is a schematic showing of dial circuit diagrams, this view showing in dot and dash blocks from top to bottom a standard dial telephone instrument with dial contacts connected into the lines of a telephone circuit; an adapter socket and plug combination with electrical contacts thereof in open position; and a contact block employed in my improved system showing contacts and leads connecting the same to contacts of the plug employed in my system as well as leads connecting the contacts of the contact block with electrical wiping brushes to afford a complete dialing circuit.

Figure 8:
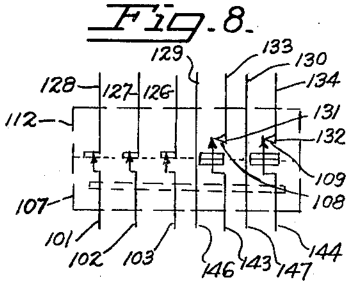

FIG. 8 is a detail of the circuit shown in FIG. 7, this view showing the contacts of the plug and socket in engagement and the circuit thereby closed for selective dialing of any given telephone number.

Figure 9:
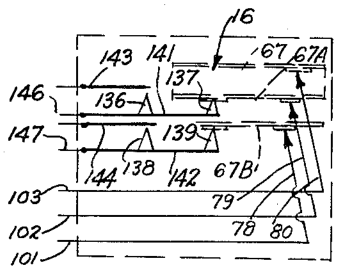

FIG. 9 is a detail of the electrical contacts and leads of the contact block of the preferred and modified embodiments of the invention, this view showing the positions of the contacts and brushes in the circuit when the dialing circuit is closed.

Figures 10, 12, 13:
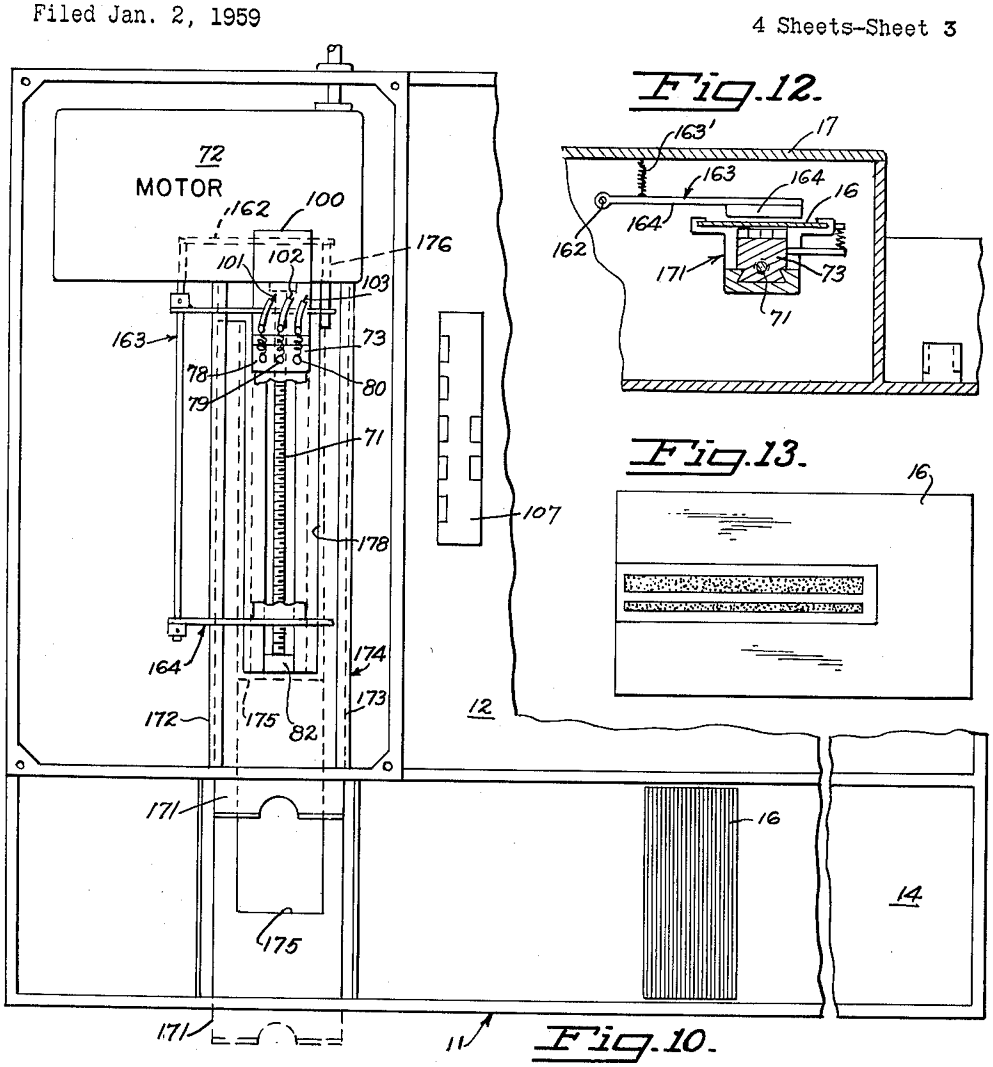

FIG. 10 is a broken plan view of a modified embodiment of the invention, with housing cover removed.

Figure 11:
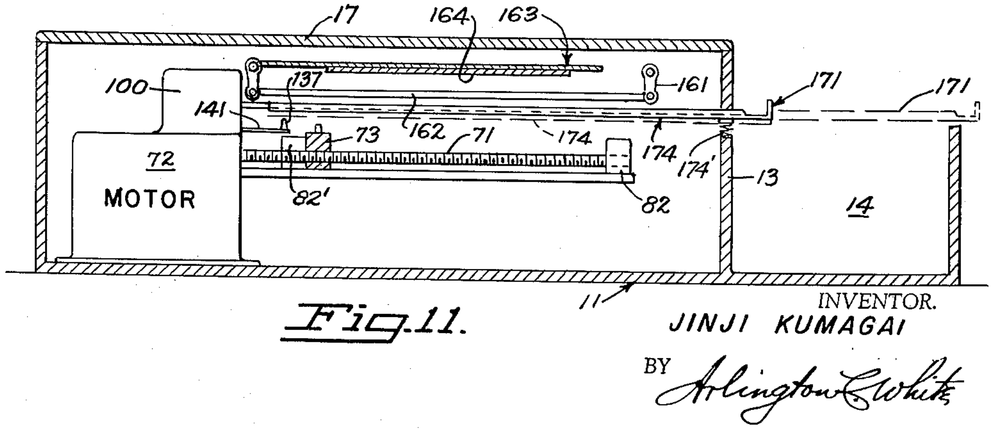

FIG. 11 is a front sectional elevational view of the modified embodiment of FIG. 10.

FIG. 12 is a detail, partly in section, illustrating the arrangement of certain parts of the modified embodiment of my invention.

FIG. 13 is a reduced plan view of a modified embodiment of contact card employed in my automatic telephone dialing system.

Figures 6, 14, 15:
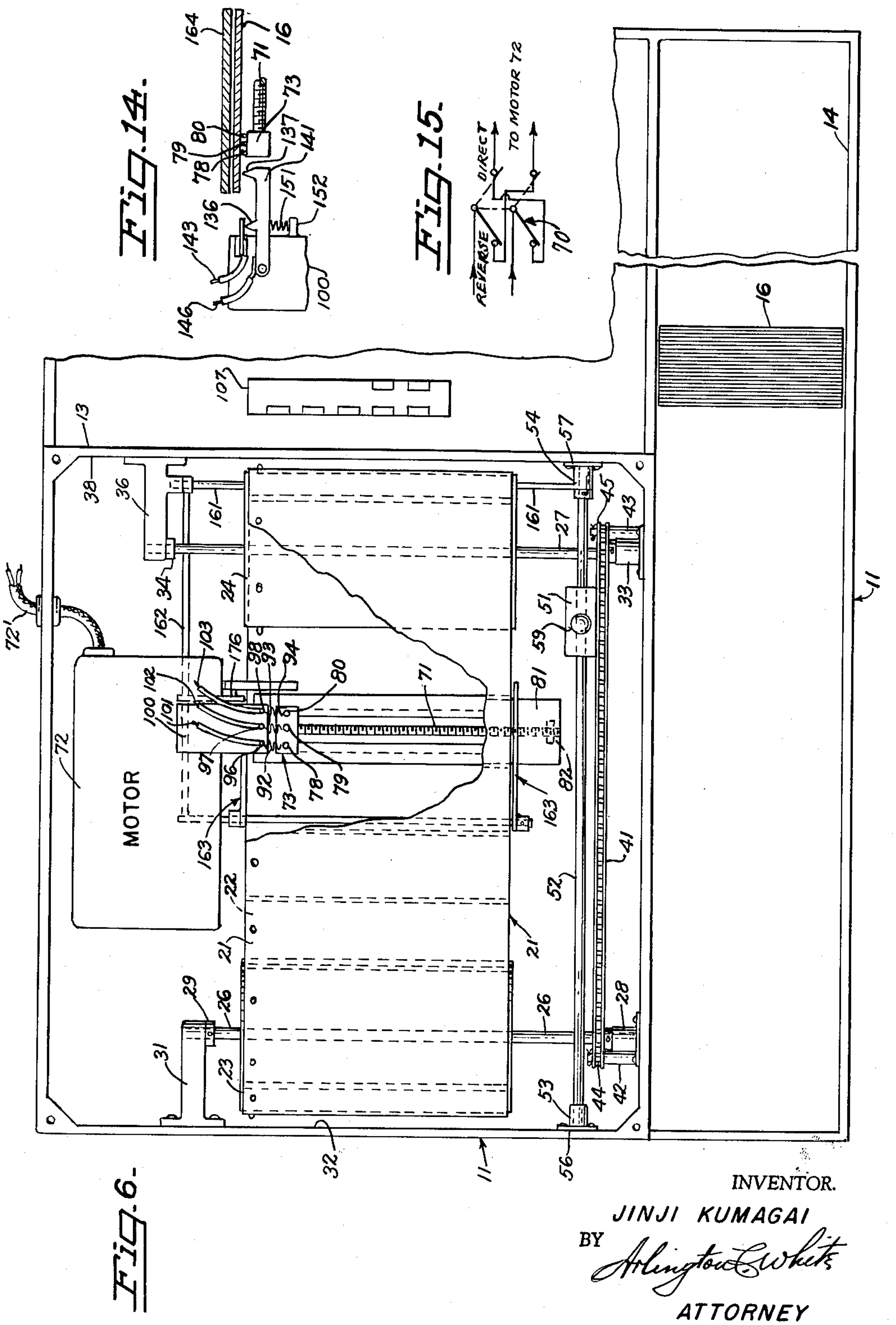
FIG. 6 is a broken plan view of a preferred embodiment of the invention with housing cover removed to illustrate the units of the operating mechanism.

FIG. 14 is an enlarged detail showing spring mountings for certain contact arms in the system.

Figures 1, 16:
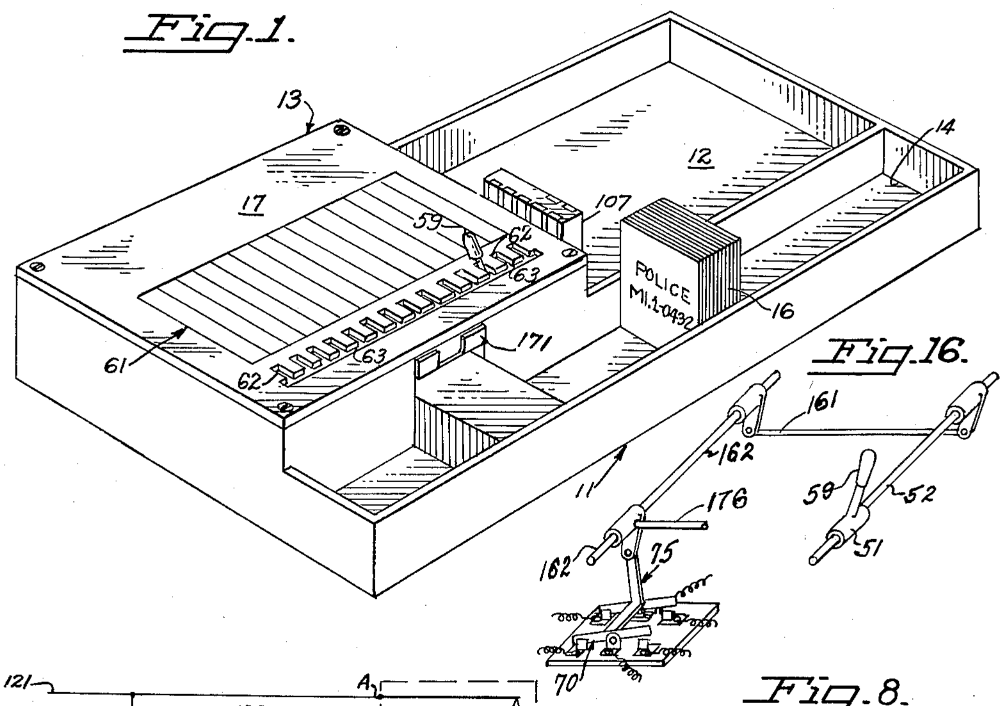
FIG. 1 is a reduced perspective view of a preferred embodiment of the invention, this view omitting the standard dial telephone instrument which seats in a section of the embodiment.

FIGURE 15 shows a motor reversing switch, and FIGURE 16 shows a linkage for actuating same.

In its preferred form, the improved automatic telephone dialing system of my present invention preferably comprises, in combination with a dial type telephone instrument and a standard telephone dialing circuit associated therewith, an adapter socket fitted to the bottom of said instrument, electrical contacts on said adapter socket and electrically connected into said standard telephone dialing circuit, a casing having an open compartment for the reception of said telephone instrument, a system dialing circuit, an adapter plug seated in said compartment for fitting into said adapter socket, electrical contacts in said plug and adapted to be electrically connected through the contacts of said adapter socket into said standard telephone dialing circuit, together with an endless belt movably supported in said casing, a plurality of pockets on said belt, a plurality of contact carrying cards removably supported in the pockets of said belt; the contacts of said cards representing different telephone numbers, electrical brushes movably supported in proximity to said belt for successively wiping the contacts of any selected one of said contact carrying cards thereby accomplishing the dialing of a telephone number, and a lever for bringing said belt to a position adjacent said brushes so that a card in the pocket of said belt may be wiped by the brushes and for automatically effecting the movement of said brushes over the contacts of a card.

A modified embodiment of my present invention preferably comprises, in combination with a dial type telephone instrument and a standard telephone dialing circuit associated therewith, an adapter socket fitted to the bottom of said instrument, electrical contacts on said socket and electrically connected into said dialing circuit, a casing having an open compartment for the reception of said telephone instrument, an adapter plug seated in said compartment for engaging said adapter socket, electrical contacts on said plug for engaging the electrical contacts of said socket, a plurality of electrical brushes movably supported in said casing, a plurality of contact cards having individual electrical contacts thereon for wiping by said brushes, means electrically connecting said brushes to said telephone dialing circuit through the contacts of said plug and said socket, means for moving said brushes over the contacts of said card, and means for positioning any selected one of said cards within said casing with the contacts of said card presented for wiping by said brushes thereby to accomplish automatic dialing of a telephone number defined by the individual contacts on said positioned card.

As particularly illustrated in FIG. 1 of the annexed drawings, the various components of my improved system can be compactly arranged within a casing, generally designated by the reference numeral 11, defining a tray or open compartment 12 at one end thereof and a housing 13 adjacent to said compartment. The casing 11 can be fabricated of Bakelite or any other suitable hard plastic substance, or can be made from a light weight metal or of wood, as desired. Casing 11 preferably is so constructed as to provide at one side thereof an elongated open cabinet 14 for the reception of a plurality of contact cards 16. Each of the cards 16 conveniently can be similar in size to a conventional business card, and on the obverse thereof there are printed in printer's ink, or engraved if desired, a telephone subscriber's name and address. On the reverse of each card 16, the subscriber's telephone number is delineated by a series of separate electrical contacts, preferably utilizing electrically conductive material such as copper paint or the like as the delineating substance in setting out the subscriber's telephone number; such delineation of contacts being hereinafter more particularly described. The housing 13 of casing 11 is conveniently provided with a removable cover 17 so that access can readily be had to the various elements contained therein.

Figure 2:
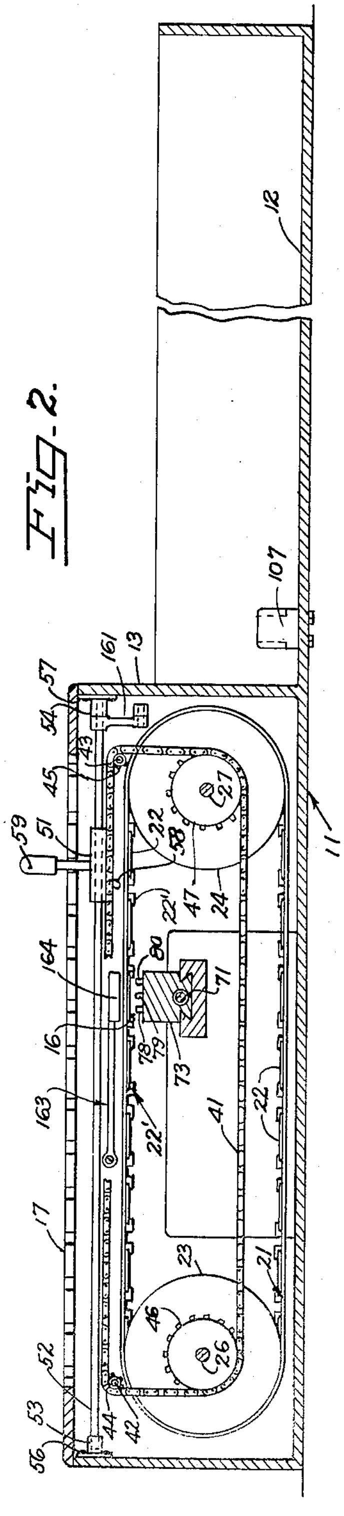
FIG. 2 is a side sectional elevational view of the preferred embodiment of the invention, this view showing certain details of the mechanism associated with the single lever for actuating the same.

In accordance with my present invention, I provide an endless belt 21, see FIG. 2, on which are formed a plurality of pockets 22 for the reception of the contact cards 16. The pockets 22 are arranged side by side throughout the entire length of belt 21 and conveniently may be formed on the belt by means of U-shaped side pieces secured in spaced relationship to afford spaced depending portions defining opposed channels 22' into which the cards 16 may be slipped and thus held on the belt 21. Or, a double belt 21 can be provided and the two belts can be cemented together transversely at spaced intervals throughout their lengths to form pockets between the cemented portions of the two belts. Other ways of forming the pockets 22 can be employed in keeping with the skill of an ordinary workman. The belt 21 is trained over a pair of spaced drums 23 and 24 which are keyed or otherwise securely fixed to a pair of shafts 26 and 27 which are in spaced relationship. Conveniently, the shaft 26 is journaled in bearings 28 and 29 (FIG. 6) which are respectively carried on the side wall of housing 13 and on a bracket 31 secured to and projecting from the front wall 32 of the housing, while shaft 27 is journaled in bearing 33 and 34 which are respectively carried in the side wall of housing 13 and on a bracket 36 secured to and projecting from the rear wall 38 of housing 13.

To rotate the shafts 26 and 27 and, consequently, the drums 23 and 24 and also the endless belt 21, I provide mechanism including an endless chain 41 which is trained over sprockets mounted on the shafts 26 and 27 and in alignment with one another. To insure proper planar movement of chain 41, I provide a pair of stub shafts 42 and 43, adjacents to the shafts 26 and 27, and mount thereon idler sprockets 44 and 45 over which the endless chain 41 passes in addition to passing or being trained over the sprockets 46 and 47 on shafts 26 and 27; see particularly FIG. 2 of the annexed drawings. In conjunction with the endless chain 41 for rotating the belt 21, I provide a slidable member 51 which is slidably mounted upon a fixed shaft 52, i.e., fixed insofar as end to end movement is concerned; the shaft 52 being journaled in bearings 53 and 54 which are mounted on brackets 56 and 57, respectively, secured to the front and rear walls of housing 13. Slidable member 51 carries a depending arm 58 (FIG. 3) which is securely attached to a link of the endless chain 41 so that movement of the slidable member 51 along the shaft 52 in either direction causes movement of the endless chain 41 in similar directions. By virtue of the sprocket connections between the endless chain 41 and the transverse shafts 26 and 27, the movement of chain 41 effects a corresponding movement of the drums 23 and 24 and the endless belt 21 carried thereon.

In order to facilitate the movement of slidable member 51 along the shaft 52, as well as to rock the shaft 52 when desired, I fashion the member 51 with an integral projecting lever 59 which is of sufficient length that it may readily be grasped and manipulated by the fingers of the hand. It is to be understood that the slidable member 51 has a longitudinally extending channel therethrough for passage of the shaft 52, and that the fit of the shaft 52 in the channel of member 51 is such that in addition to permitting slidable movement of the member 51 along the shaft 52 longitudinally, the shaft 52 can be oscillated in its bearing 53 and 54 by lateral movement of the member 51 on the shaft 52. This sliding movement as well as lateral movement of the member 51 can be accomplished by grasping the projecting lever 59 of member 51 and applying manual force thereon in whatever direction of movement desired so as to move member 51 in the direction desired. Oscillation of shaft 52 by lateral movement of member 51 effects the movement of linkage, hereinafter described, not only for depressing the belt 21 but also for effecting the rotation of a reversible motor which is connected into an electrical circuit described hereinafter.

In accordance with the invention, and as particularly illustrated in FIG. 1 of the annexed drawings, I provide an index 61 of telephone subscribers' names and telephone numbers which are synchronized with the same data delineated and carried on the contact cards 16. The index 61 conveniently is delineated in successive rows on the outer surface of the cover 17 of the housing 13. To correlate the index 61 with the endless belt 21 and the mechanism for effecting movement of the belt, the cover 17 of housing 13 is slotted laterally adjacent each row of the index 61 and also is slotted longitudinally of such index, as indicated by the short slots 62 and the long slot 63, respectively, in order to pass the lever 59 of movable member 51 as such lever 59 is thrown both laterally and moved longitudinally relative to the shaft 52; the shaft 52 being so mounted and arranged within housing 13 as to lie immediately below the cover 17 with the lever 59 of movable member 51 projecting through and appreciably above the long slot 63 in cover 17. The delineation on index 61 are such that the list of telephone subscribers' names and telephone numbers corresponds to the successive arrangement of corresponding contact cards 16 which are removably disposed in the pockets 22 of endless belt 21. Thus, movement of the movable member 51, through the medium of the lever 59, along the shaft 52 to a position where the lever 59 in long slot 63 is opposite a short slot 62 leading to a row of the index 61 in which a specific telephone subscriber's name is delineated, will insure that such subscriber's telephone number will be automatically dialed when the lever 59 is moved into the small slot 62 opposite such name; such movement of lever 59 being a lateral movement to rock or oscillate shaft 52 thus setting in motion the various components of my improved automatic dialing system hereinafter described. This insuring of the automatic dialing of the subscriber's number selected in index 61 by the manipulation of lever 59 of movable member 51 is because the contact card 16 of the particular subscriber selected has not only been properly placed, or synchronized, in position in a pocket 22 on the belt 21 but also by reason of the fact that such contact card 16 has been brought to a location, by axial shifting of member 51 along shaft 52 and consequent movement of belt 21, in relation to other components of the system that the electrical contacts on card 16 will be wiped by electrical brushes, as hereinafter explained, forming a part of the electrical circuit of the system.

Figures 3, 4, 5:
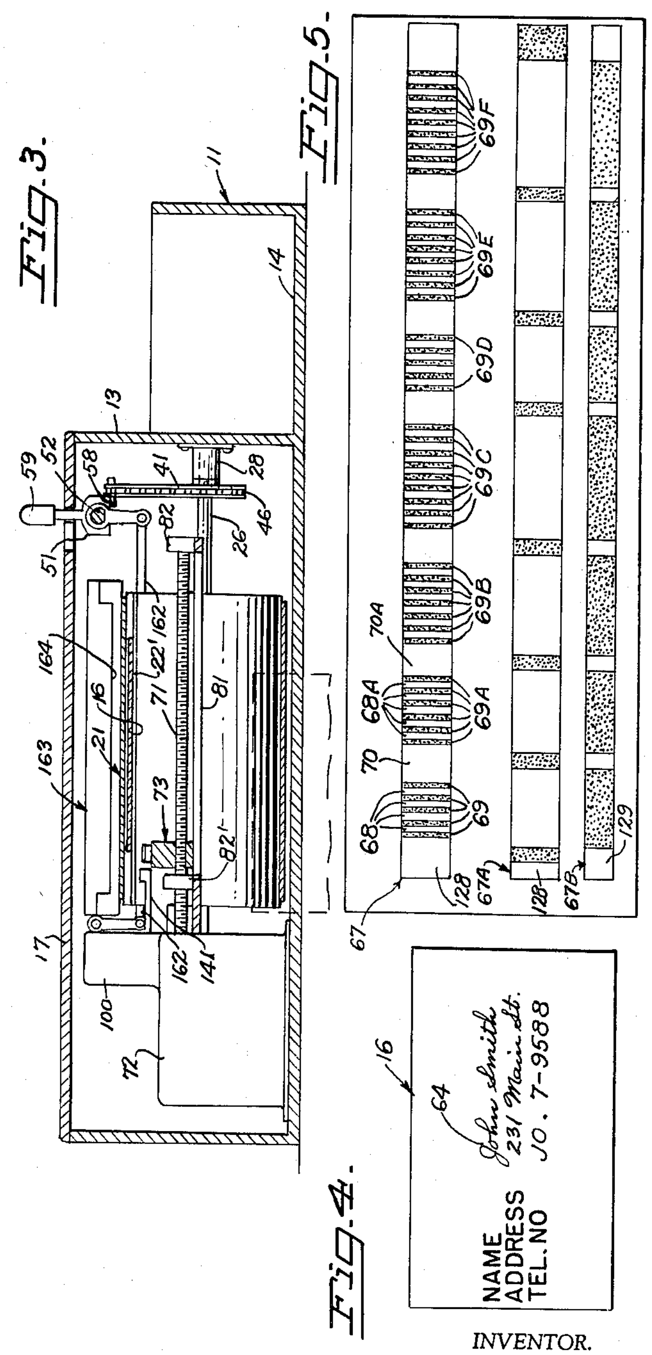
FIG. 3 is a front sectional elevational view of the embodiment shown in FIGS. 1 and 2.
FIG. 4 is a reduced plan view of the one of the contact cards employed in the system, this view being the obverse of the card and the dotted lines indicating score lines upon which the card may be severed.
FIG. 5 is an enlarged plan view of the reverse of the card shown in FIG. 4 and illustrating individual contact elements as well as insulation spaces.

Each of the contact cards 16, see FIGS. 4 and 5 of the annexed drawings, preferably is formed to a size for convenient insertion into and removal from the pockets 22 of endless belt 21; each card being delineated on its obverse side by means of printing, typing or otherwise, with a given telephone subscriber's name, address and telephone number, much as in the case of a standard business card and all as indicated by the reference numeral 64. On the reverse of each card 16, there are delineated three independent and spaced strips or linear paths 67, 67A and 67B each having a base which is copper-surfaced or surfaced with any other electrically conductive material. These strips or paths consist of a combination of electrical contact areas, such as 68, and electrically insulated areas, such as 69; the path 67 defining the telephone number appearing on the reverse of a given contact card 16. These linear paths may be formed by providing a base surface of copper paint, or a paint of some other electrically conductive material, which is interrupted at predetermined intervals by one or a series of thin plastic strips 69 which may be adhesively or otherwise fixedly secured to the reverse of the card 16 and arranged transversely of the paths 67, 67A and 67B, all as illustrated in the enlarged showing of the reverse of a card 16 in FIG. 5. Or, the reverse of each card can be provided with longitudinally extending plastic strips overlying each of the entire indicated paths, and the electrical contacts 68 formed by transversely cutting out or severing the overlying plastic strips at predetermined points to uncover the underlying copper base.

Assuming that the subscriber whose name appears on the obverse of a card 16 has Jordon 7–9588 as his telephone number, which ordinarily is dialed by the prefix JO followed by the secified digits, the delineation on the reverse of that particular card 16 will be such as to have a first grouping of five individual plastic strips 69, which are termed breaks hereinafter, and which represent the letter J on the dial of a standard dial telephone; such breaks being spaced from one another by conductive material 68. The first grouping immediately followed by a wide conductive area 70 which constitutes a spacer between the first and second group of breaks. Thereafter, from left to right, the reverse of the contact card 16 shown as an example in FIG. 5 will have a second group of six individual strips or breaks 69A, representing the letter O of the pre-fix JO, arranged side by side but in spaced relationship; the spaces between the breaks being electrically conductive areas, designated as 68A in the drawings, which second group 69A as immediately followed by a wide area 70A of electrically conductive material constituting a spacer between the second group 69A and a following third group. The next or third group of individual breaks will have seven projecting plastic strips or breaks 69B representing the first digit 7 of the particular telephone number above specified; the following group or strips or breaks will have nine individual breaks 69C, the next group will have five individual breaks 69D, and the two following groups of strips or breaks 69E and 69F will each have eight individual breaks to complete the digits alongside the pre-fix or exchange JO, or the complete telephone number JO 7–9588, all in projecting strips or breaks separated by strips or areas of electrically conductive material. The other paths 67A and 67B will be engaged by two of the electrical brushes to complete the electrical circuit of the system when such brushes are moved over the reverse of the card 16 with the first brush of the three wiping brushes engaging or wiping the linear path constituting the strip 67.

Any desired number of contact cards 16 may be made up with different grouping of breaks and contact strips representing different telephone numbers, and such cards stacked in the open cabinet 14 of the casing 11. Those contact cards 16 carrying telephone numbers more often called can be withdrawn from the cabinet 14 and arranged, alphabetically if desired from left to right, in the pockets 22 of belt 21. When such selection is made for disposal on the belt 21, the index 61 should be filled out in the same sequence, that is, alphabetically from top to bottom to correspond with the arrangement of the contact cards 16 in the pockets 22 of belt 21.

In accordance with the present invention, means are provided for wiping the three strips 67, 67A and 67B of any selected one of the contact cards 16 to establish the electrical circuit of my improved automatic telephone dialing system to connect such circuit into the standard dial circuit of a conventional telephone dialing system, so that by effecting a series of predetermined openings and closings of the dial circuit as delineated in the linear path 67 on the reverse of a given contact card 16, representing a specific telephone number, by the series of the electrically non-conductive strips, such as 69, and electrically conductive areas, such as 68, the automatic dialing of a telephone number inclusive of the prefix or exchange symbol is accomplished. These means include a worm shaft 71 which is splined or otherwise secured to the drive shaft, not shown, of a reversing motor 72, together with an electrical brush-carrying unit 73 which is in meshing engagement with the worm 71 and which has its brushes 78, 79 and 80 projecting from the top thereof and normal thereto. The worm shaft 71 is journaled in suitable bearings secured to the frame 81 at the approximate center of the housing 13 and underlies the upper run of the endless belt 21 so that as the worm 71 is rotated in one direction of rotation by reason of the rotation of the shaft of motor 72, the brush-carrying unit 73 is advanced outwardly from the motor longitudinally along the worm 71 and transeversely of the belt 21 as well as a contact card 16 held therein. At the outer end of worm 71, I provide a stop 82 which is connected by a lever, not shown, in turn connected to a motor stop switch, also not shown, so that when the brush-carrying unit 73 strikes the stop 82 the motor 72 will be stopped by the throw of the stop switch, above mentioned.

It is to be understood that during a telephone conversation, the unit 73 will remain at the stop 82 but that such unit 73 will be returned to its initial position adjacent to the casing of motor 72 after the call has been completed and lever 59 has been withdrawn from the slot 62 of index 61 into which the lever had been moved in initiating the automatic dialing of a telephone number on the reverse of selected card 16.

This action of withdrawing of the lever 59 from a given slot 62 in the index 61 causes the reversal of the motor 72, or the operation thereof in a direction of rotation opposite to the direction it had rotated in moving the unit 73 outwardly along worm 71, and by virtue of such motor reversal, the unit 73 is returned, as stated, to its initial position where it strikes a stop 82' causing the actuation of a stop switch, not shown, and the motor 72 is again stopped. Linkage, not shown, is connected to the links hereinafter described that are connected to lever 59, in order to raise the motor stop switches again so that the system is conditioned for starting the motor when additional telephone numbers are automatically dialed by my improved system.

Suitable electrical leads 92, 93 and 94 of a length slightly greater than the length of the worm 71 are provided for connecting the brushes 78, 79 and 80, respectively, to electrical terminals 96, 97 and 98 which are mounted on an insulated block 100; such block being conveniently installed on the case of motor 72. The contacts 96–98 inclusive are respectively connected by conductors 101, 102 and 103, respectively, to the prong contacts 104, 105 and 106 of an electrical connector plug 107 which is fixedly secured to the bottom of compartment 12 of casing 11, as indicated in FIG. 1 of the annexed drawings. Thus brushes 78–80 inclusive, leads 92–94 inclusive, terminal 96–98 inclusive, and conductors 101–103 inclusive together with prong contacts 104–106 inclusive constitute a major portion of the electrical circuit of my improved system which is connected through the plug 107 and an adapter socket, as hereinafter explained, to the standard telephone dial circuit.

While I have omitted from FIG. 7, for purposes of clarity, the several terminals 96, 97 and 98 as well as the leads 92, 93 and 94 between the electrical brushes 78, 79 and 80 of the brush-carrying unit 73, I have shown in FIG. 7 by means of dash lines the three linear paths 67, 67A and 67B delineated upon the reverse of each of the contact cards 16. And, since FIG. 7 represents an "off" position of my system, the brushes 80, 79 and 78 are shown in disengaged positions with respect to such linear paths 67, 67A and 67B, respectively. I have also illustrated schematically in FIG. 7 of the annexed drawings, additional pairs of electrical contacts 136, 137 and 138, 139 which form a part of the electrical circuit of my improved system and which are secured to adjacently disposed arms 141 and 142 that are yieldably mounted on the insulated block 100. The paired contacts 137 and 139 are carried on the outer extremities of the arms 141 and 142 while the paired contacts 136 and 138 are carried on these arms, respectively, adjacent to their centers. As shown in FIG. 7, representing the "off" position of my automatic telephone dialing system so that normal dialing of a telephone number can be made using the dial of the telephone instrument, the paired contacts 136 and 138 are shown in engagement with conductors 143 and 144, respectively, connected to contact prongs 108 and 109, respectively of the connecter plug 107, while the paired contacts 137 and 139 are shown as being connected to conductors 146 and 147 leading to the connector plug 107. The arms 141 and 142 project outwardly and horizontally from the block 100 and are arranged in parallel relationship with the outer pairs of contacts 137 and 139 of these arms underlying the upper run of the belt 21 so as to be in underlying registry with the electrical contact areas 128 and 129 at the inner ends of the linear paths 67, 67A and 67B of the contact cards 16 as one of such cards is carried in a pocket of the belt 21 and brought into overlying relationship to the brush-carrying unit 73. Thus, when a contact card 16 is depressed, as hereinafter described by the depression of the upper run of the belt, the electrical contact areas 128 and 129 of the linear paths 67, 67A and 67B of a contact card 16 are brought into engagement with the outer pair of contacts 137 and 139 on the yieldably mounted arms 141 and 142. The pair of arms 141 and 142, of which but one arm 141 is shown in FIG. 14 of the annexed drawings, are normally urged upwardly under the influence of springs 151 which are secured to the underside of each arm and anchored to projections 152 extending from the block 100. Upon depression of the belt 21, together with the contact cards 16, the cards depress the arms 141 and 142 against the action of their associated springs 151, thus taking the other pair of contacts 136 and 138 of these arms 141 and 142 out of engagement with the associated conductors 143 and 144.

Of course, this action of depressing the belt 21 only takes place when the telephone instrument 111 has been seated in compartment 12 of casing 11 and the plug 107 has been connected to the socket 112 in the bottom of the telephone instrument, and after the selection of a card 16 and placement thereof in overlying relationship to the brush-carrying unit 73 by moving the lever-carrying unit 51 along shaft 52 together with movement of the lever 59 into a slot 62 of index 61 corresponding to the subscribers' name on selected card 16. As stated above, by such action the motor 72 is started and the telephone number on the reverse of the selected card 16 is automatically dialed.

The schematic showing of FIG. 8 of the annexed drawings illustrates the plug 107 and the socket 112 fitted together as well as the circuit change effected thereby. As shown, the contact prongs 108 and 109 of the connector plug 107 have engaged the contacts 131 and 132, respectively, and have moved the same away from their former positions engaging the leads 129 and 130, respectively, which connected such contacts 131 and 132 with the outgoing dial lines 122 and 125, respectively. Thus, the standard telephone dial circuit has been bypassed so as to include the electrical units and connection of my improved automatic dialing system. By such bypassing of the telephone dialing circuit, dial lines 121–125 inclusive lead to and through the socket 112 and connector plug 107 to connect to the conductors 101–103 leading to the brushes 78–80 inclusive as well as to connect to the conductors 146 and 147 leading to the paired contacts 136, 138 and 137, 139 carried on the yieldably mounted arms 141 and 142. When the belt 21, together with a card 16 positioned therein, are depressed, resulting in the depression of the contacts on arms 141 and 142, the incoming circuit may be further traced from the brushes 78–80 and the delineated contacts 68 on the cards 16, then the contact areas 128 and 129 of said cards through the engaged outer contacts 137 and 139 on the arms 141 and 142 back through the leads 146 and 147 to connector plug 107 and thence through engaged contacts 116 and 117 of socket 112 over outgoing lines 122 and 125 of the telephone instrument 111 so as to complete the dialing circuit through the electrical connections and units of my improved system.

It may be observed that despite the by-passing of the standard telephone dial circuit, just described, such regular or standard telephone dial circuit is nevertheless maintained notwithstanding the connecting of the plug 107 on socket 112 and, therefore, normal dialing of a telephone number using the dial on the telephone instrument 111 can still be effected. However, such plug and socket connection also conditions the system for automatic dialing of telephone numbers by manipulation of lever 59 and its associated member 52 and linkage connected therewith for depressing the belt 21, all as hereinabove explained.

In FIG. 9 I have schematically illustrated the unit and part of the dialing circuit arrangement after the belt 21, together with a contact card 16 has been depressed, to bring the contact areas 128 and 129 of the linear paths 67, 67A and 67B, respectively, into depressing engagement with the paired contacts 137 and 139 of the yieldably mounted arms 141 and 142, with the consequent disengagement of the paired contacts 136 and 138 from their associated conductors 143 and 144, respectively. As shown, by such aforementioned depression of belt 21 and associated card 16, the brushes 78–80 of the brush-carrying unit 73 are brought into engagement or engaging relation with the linear paths 67, 67A and 67B of the selected contact card 16 which has been brought into overlying relationship with the brush-carrying unit 73. In short, the schematic showing of FIG. 9 represents the "on" position of my improved automatic dialing system. It is clear that as the brushes 78–80 wipe or engage the contacts and breaks of the linear paths 67, 67A and 67B of a given contact card 16 as the brush-carrying unit 73 travels the length of the worm 71, the circuits are complete and the particular telephone subscriber's number that is delineated on the reverse of the card 16 that has been properly positioned in overlying relationship with the brush-carrying unit 73 is automatically dialed during such wiping action of the brushes 78–80 inclusive.

It is to be understood, of course, that in disposing the cards 16 in the pockets 22 of belt 21, the obverse of the card is on the top and the reverse of the card is on the bottom so as to present the strips or paths 67, 67A and 67B of the cards to the brushes 78–80. The depression of the belt 21 conveniently is effected through linkage including a rod 161 which is connected to the shaft 52 and partially rotated thereby when the lever 59 of movable member 51 is moved into any one of the short slots 62 of index 61 thereby to partially rotate shaft 52. The above mentioned linkage also includes a rod 162 which is connected to rod 161 and rotated or turned thereby so as to cause the lowering and raising, when desired of a depressor member 163 having an element 164 thereon which substantially spans the belt 21 transversely. Turning of the rods 161 and 162 in one direction of rotation causes the depressor 163 with its element 164 to drop or lower into engagement with the upper run of the belt 21 thereby to cause the latter, at the point of the depressing force, to move into close proximity to the upper ends of the brushes 78–80 inclusive; while turning of the rods 161 and 162 in the opposite direction of rotation effects a raising of the depressor 163 as well as of the upper run of the belt 21. These turning movements of the rods 161 and 162 are accomplished entirely by the movements of the lever 59 into and out of the short slots 62 of the cover 17 constituting a part of the index 61.

As explained above, when the lever 59 is withdrawn from a short slot 62 the motor 72 reverses direction of rotation to cause the brush-carrying unit 73 to return to its initial position. At the same time, the upper run of the belt 21 is returned to an un-depressed position, by virtue of the turning of linkage 161 and 162 as well as the shaft 52 so that the contact strips 67, 67A and 67B are no longer engaged by the brushes 78–80 and, consequently, are not engaged on the return movement of the brush-carrying unit 73 to its initial position. After withdrawal of the lever 59 from one of the short slots 62, it is in a position so that it can effect the movement of member 51 along shaft 52 since the lever 59 can pass freely along the long slot 63 of cover 17 constituting a part of the index 61. Thus, the belt 21 can be rotated through the connections between the depending arm 58 of member 51 and the endless chain 41 and its sprockets on the drums 23 and 24, simply by moving the member 51 along the shaft 52. Since the sprockets 46 and 47 over which the endless chain 41 is trained are mounted on the same shafts 26 and 27 to which the drums 23 and 24 are keyed, and since the ratio between the diameters of sprockets 46 and 47, on the one hand, and the circumferences of the drums 23 and 24, on the other hand, preferably is fixed to a ratio of approximately 2.5 to 1, the endless belt 21 is moved a distance of approximately 2.5 inches for every inch movement of the endless chain 41 by the shifting of movable member 51 on shaft 52. Thus, the index 61 is synchronized with the positions of the contact cards 16 in the pockets of belt 21 so that relatively short movement of lever 59 from short slot 62 to another short slot 62 of index 61, or a relatively long movement of lever 59 through long slot 63 of the index 61 will cause either a short or a long movement of belt 21 to bring the proper contact card 16 into alignment over the brush-carrying unit 73 for wiping the contacts 68, 68A, etc., etc., of card 16 by the wiping brushes on the unit 73.

A modified embodiment of the invention is illustrated in FIGS. 10–13, inclusive of the annexed drawings. In this modification, the endless belt 21 and the mechanism for moving the same are eliminated and, in lieu thereof, I provide a card chute or card transfer member 171 which conveniently is slidably mounted on a pair of rails 172 and 173 supported on an auxiliary frame 174; the frame 174 being a floating frame depressible, as shown by the dotted lines in FIG. 11, against the action of springs 174'. A window 175 is provided in chute 171 through which the contact cards 16 are made accessible to the wiping brushes 78–80 of the brush-carrying unit 73. Various components of the preferred embodiment of the invention are employed in the modification shown in FIGS. 10–13 inclusive, and the reference numerals designating such components in the preferred embodiment are utilized in the following description of the modified embodiment of the invention.

As shown particularly in FIG. 10 of the drawings, the casing 11 is provided at one end thereof with an open compartment 12 for the reception of a standard dial telephone instrument 111, not shown in this view, and an open cabinet 14 at one side of the casing 11 is provided for the reception of a plurality of contact cards 16. These contact cards 16 are in all respects similar to those described above and a reduced plan view of the reverse side thereof is shown in FIG. 13 with the exception that the electrical contact areas and the electrical non-conductive areas are not illustrated. As in the preferred embodiment, a worm 71 is employed and is connected to the drive shaft of a reversing motor 72 for rotation thereby into opposite directions of rotation; the worm serving to carry a brush-carrying unit 73 thereon which is advanced longitudinally of the worm in both directions upon rotation of motor 72 in both directions. The unit 73 supports electrical brushes 78, 79 and 80 for wiping or engaging the electrical contacts and electrical non-conductive areas of each contact card 16 which is positioned in overlying relationship to the brushes 78–80 by means of the slidably mounted card transfer member 171. It is to be understood that when a specific telephone subscribers' telephone number is to be automatically dialed, using the modification of FIGS. 10–13, inclusive, a particular card 16 is withdrawn from the group of contact cards held in the open cabinet 14 of casing 11 and placed with its reverse side down in the chute 171, and the chute then moved inwardly to bring the specific card in overlying relationship to the worm 71. As stated above, chute 171 is formed with a window 175 therein through which the reverse or contact side of the card 16 is presented to the brushes 78–80.

In accordance with the modified embodiment of my invention, I provide a rod 176 which, at its inner end, is connected to the above described linkage leading from the shaft 52, not shown in this view, and which includes the links 161 and 162. The link 161, in addition to being connected to link 162 for lowering the holder or depressor 164 into engagement with the belt 21 of the preferred embodiment shown in Figs. 1–6 inclusive, is connected to an arm of a double-throw reversing switch, not shown, which is electrically connected into the auxiliary electrical circuit containing the reversing motor 72. Thus when rod 176 is pushed inwardly by the movement of the chute 171 inwardly, the link 161 is turned to actuate the reversing switch in one direction to cause rotation of motor 72 in one direction of rotation whereby the brush-carrying unit 73 is moved outwardly along the worm 71. In this outward movement of unit 73 the brushes 78–80 thereon wipe the contact strips on the reverse of the card 16 which has been positioned in overlying relationship to the brush-carrying unit 73. It also is to be observed that the inward movement of rod 176 by the inner end of chute 171, when the chute is pushed to its most inward position, causes the rotation of link 162 of the above described linkage to depress the element 164 of depressor 163 and to press the card 16 downwardly into position for engagement by the brushes 78–80 of unit 73, which action lowers the card 16 in the section thereof accessible through window 175 of the chute or card transfer member 171 as well as causes the depression of the auxiliary frame 174 against the action of its mounting spring 174' to bring the contacts 137 and 139 of the arms 141 and 142, respectively, see FIG. 14, into engagement with the contact areas 128 of the paths 67, 67A and the contact area 129 of the path 67B of the contact cards 16. When the chute 171 is withdrawn from its innermost position, the element 164 of depressor 163 is raised from the card 16 under the influence of a spring 163' which is anchored at its one end to the housing 13 and its other end to the depressor or holder 163. The withdrawal of chute 171 is carried out after the completion of the automatic dialing of a telephone number on a selected card and the telephone conversation has been completed. The automatic raising of the depressor 163, upon withdrawing the chute 171 causes a turning of the links 162 and 161 in the opposite direction which, in turn, effects the throwing of the motor reversing switch in the opposite direction to cause rotation of the motor 72 in the opposite or reversing direction thereby causing the brush-carrying unit 73 to reverse and to return along worm 71 to its initial position. This action causes the system to be conditioned for the automatic dialing of a second telephone number delineated on another contact card 16 withdrawn from the stack of cards in the cabinet 14.

As illustrated in Fig. 1, the chute 171 and the other components of the modification of FIGS. 10–13 inclusive can be incorporated in casing 11 along with all of the components of the preferred embodiment of the invention. Thus, if for some reason a telephone subscribers' number is desired to be dialed which is not among the list on index 61 but which is contained on a card in the stack of cards in cabinet 14, such latter contact card can be withdrawn from the cabinet 14 and placed in the chute 171 with its reverse side down so that the electrical contacts thereon will be presented to the brushes 78–80 of the brush-carrying unit 73. The inward push of chute 171 will move rod 176 inwardly to effect the lowering of the depressor 163 and its element 164 into pressing engagement with the belt 21 which, in turn, presses downwardly on the card 16 in the chute 171 to bend the same slightly and present the contacts thereon through the window 175 of chute 171 for engagement by the wiping brushes 78–80 of the unit 73 which moves outwardly along worm 71 when the motor is started by the turning of link 161 through movement of rod 176. This use of the chute 171, instead of movement of and depression of belt 21, in no way interferes with the components above described of the preferred embodiment of the invention.

Thus, from the foregoing described preferred and modified embodiments of my invention, it is apparent that with a contact card 16 in the chute 172, and the latter in its most inward position overlying the brush-carrying unit 73, or with one selected card 16, of the plurality of such cards held in pockets 22 of belt 21, brought into overlying relationship to unit 73, the delineated telephone number on the reverse of the thus positioned contact card 16 can be automatically dialed. Using the chute 171, and with the lever 59 of member 51 in the elongated slot 63 of index 61, the inward push of the chute 171 starts motor 72 and brings the belt hanger 163 with its depressor 164 into depressing engagement with the floating frame 174 to lower the same as well as the chute 171 and its carried contact card 16 into engagement with the brushes of the unit 73. Of course, this depressing action also lowers the yieldably mounted arms 141 and 142, see FIG. 14, to take the paired contacts 136, 138 out of engagement with conductors 143 and 144, respectively, and to bring the paired contacts 137, 139 of the arms 141 and 142 into engagement with the contact areas 128 and 129 of the strips 67A and 67B of the positioned contact card 16; thus effecting the transfer of the electrical system from the standard dialing circuit to the automatic dialing lines of my system, as illustrated schematically in the showing of FIG. 9. Using the belt 21, rather than chute 171, the lever 59 of member 51 is moved along the shaft 52 in slot 63 until it reaches a slot 62 opposite a subscriber's name on index 61 whose telephone number is to be automatically dialed. Then, lever 59 is moved into the selected slot 62 and this action effects the movement of linkage 161 and 162 to cause the hanger 163 to drop onto the belt 21 and with its depressor element 164 to depress the belt 21 so as to bring the linear strips 67, 67A and 67B of the selected contact cards 16 into engagement with the underlying brushes 78–80 carried on the unit 73; such movement of the lever 59 also starting the motor 72 to cause the unit 73 to traverse the length of the worm 71. As in the case of using the chute 171, which chute may be considered a lever or the equivalent of a lever, such as the lever 59, the depression of the belt 21 causes the depression of the yieldably mounted arms 141 and 142 to transfer, as mentioned above, the standard dialing system from the standard telephone dialing to the automatic telephone dialing lines of my system.

Upon withdrawing the chute 171 to its outermost position, or upon withdrawing the lever 59 from any given slot 62, after the completion of a telephone conversation, the various components of my system are all returned to their initial positions and the motor 72 stopped so as to condition the system for the succeeding operation of automatically dialing either the same or a different telephone subscriber's telephone number. As indicated in FIG. 6, the motor 72 is electrically connected through leads in a cable 72' to a source of electrical energy, not shown, and the stops 82 and 82' are shown diagrammatically as connected to levers for actuating stop switches, all not shown, in the electrical circuit containing the motor; such stop switches being actuated when the unit 73 reaches the ends of the worm 71 and engages the stops 82 and 82'.

In FIG. 15 of the annexed drawings, I have shown a double-pole, double-throw motor reversing switch 70 which is actuated by linkage 75, see FIG. 16 of the annexed drawings, which in turn is connected through suitable adapters to the rods 162, 161 that are, in turn, connected to the shaft 52 which, as stated above, may be oscillated by movement of the lever 59 into and out of the short slots 62 of the index 61, see FIG. 1 of the drawings. When the lever 59 is moved into the slot or any given slot 62, the shaft 52 is rotated or oscillated in one direction of oscillation or rotation and this effects the turning of rods 161 and 162, together with linkage 75 to close the switch 70 so that the motor 72 will rotate in one direction of rotation. When the lever 59 is withdrawn from any given slot 62 of index 61, the shaft 52 is oscillated or rotated in a direction opposite to that in which it had previously been moved and, consequently, the rods 161 and 162 as well as the links 75 will be moved in opposite directions to throw the switch 70 to its opposite contacts thereby causing the motor 72 to rotate in a direction opposite to the direction of rotation that it had previously been moved. Of course, when the modification shown in FIGS. 10–13, inclusive, is employed, using the chute 171 to start the motor, the rod 176 will cause the actuation of the link 75 to cause the switch 70 to be placed into either one of the motor contacts or to start the motor 72 in one direction of rotation or the other depending upon the position of the brush-carrying unit 73. When the chute 171 is moved into its innermost position, the motor is started through the linkage 176 and 75, as well as the switch 70 in one direction of rotation to move the brush-carrying unit 73 outwardly so as to engage the stop 82. When the chute 171 is withdrawn from its innermost position the rod 176 retracts causing the link 75 to throw the switch 70 against the other contacts and to reverse the direction of rotation of the motor so that the brush-carrying unit 73 is returned to its initial position against the stop 82' which, of course, stops the motor 72.

It is to be understood that the appended claims are to be accorded a range of equivalents commensurate in scope with the advance made over the prior art.

I claim:

1. An automatic telephone dialing system comprising, in combination with a telephone dialing circuit and a dial telephone instrument, an adapter socket secured in the bottom of said instrument; the sockets of said adapter socket being open to the exterior of said instrument, electrical contacts in said socket and connected to the dial lines of said telephone dialing circuit, a casing having an open compartment for the reception of said telephone instrument, a connector plug seated in said compartment, electrical contacts on said plug for removably fitting the sockets of said adapter socket when said telephone instrument is seated in said compartment, leads establishing electrical connection between the contacts of said socket and the contacts of said plug, an electrical circuit, a reversing motor mounted in said casing and connected into said electrical circuit, a worm in driving connection with said motor, a brush-carrying unit movably mounted on said worm, electrical wiping brushes carried on said unit, leads connecting said brushes with said contacts of said connector plug to establish electrical connection through said adapter socket with said telephone dialing circuit, an endless belt rotatably mounted in said casing; said belt having a plurality of pockets thereon, a plurality of contact cards supported in the pockets of said belt, a series of electrical contacts delineated on each of said contact cards and defining different telephone numbers, a shaft journaled in said casing, a movable member mounted on said shaft for movement axially thereof and for oscillating said shaft in opposite directions, a lever on said movable member for shifting it to different positions on said shaft as well as for moving said member to oscillate said shaft, an endless chain rotatably mounted in said casing and connected to said belt, means connecting said movable member to said chain for rotating the same as well as said endless belt thereby to bring one of the pockets of said belt containing a contact card into overlying relationship with respect to said worm, and linkage connected to said shaft for starting said motor in both directions of rotation as well as for depressing said belt at a position overlying said worm whereby a card in a pocket of said belt is brought into position for wiping engagement by said brushes; movement of said lever to move said member along said shaft effecting the rotation of said belt and depression thereof to effect transfer of the telephone dialing lines through said socket and connector plug to the lines of the system, while movement of said lever laterally in one direction effecting the oscillation of said shaft and rotation of said motor as well as said worm whereby said brush-carrying unit is moved along said worm to cause the brushes on said unit to serially wipe the electrical contacts on a positioned card thereby to automatically dial the telephone number defined by the electrical contacts on said positioned contact card.

2. An automatic telephone dialing system comprising, in combination with a telephone dialing circuit and a dial telephone instrument, an adapter socket secured in the bottom of said instrument; said adapter socket having a plurality of sockets opening to the exterior of said instrument, a connector plug removably fitting the sockets of said adapter socket, a casing, a brush-carrying unit movably mounted in said casing, means establishing electrical connection between the brushes of said brush-carrying unit and said telephone dialing circuit through said connector plug and said adapter socket, a plurality of contact cards in said casing, electrical contacts on each of said cards defining different telephone numbers, a rotatable belt for holding a series of said contact cards, means for rotating said belt to bring a selected card of said series of cards into juxtaposition to the brushes of said unit for enabling brush-wiping of the electrical contacts of said selected card, and means automatically actuated by the rotation of said belt for moving said brush-carrying unit relative to said one selected contact card to wipe the contacts on the selected card with the brushes of said unit whereby the telephone number defined by the electrical contacts on said selected contact card is automatically dialed.

3. An automatic telephone dialing system comprising, in combination with a telephone dialing circuit and a dial telephone instrument, an adapter socket secured in the bottom of said instrument; said adapter socket having a plurality of sockets opening to the exterior of said instrument, a connector plug removably fitting the sockets of said adapter socket, a casing, a brush-carrying unit movably mounted in said casing, means establishing electrical connection between the brushes of said brush-carrying unit and said telephone dialing circuit through said connector plug in said adapter socket, a plurality of contact cards, electrical contacts on each of said cards defining different telephone numbers, an endless belt rotatably mounted in said casing; said belt having a plurality of pockets therein for holding a plurality of said contact cards in predetermined arrangement, an index mounted on said casing, indicia on said index relating to said contact cards and corresponding to the arrangement of said cards in the pockets of said belts, means for selecting and identifying a card of said index and movable relative to said index for rotating said belt to bring a selected card into juxtaposition to the brushes of said unit for enabling brush-wiping of the electrical contacts of said selected contact card, and means actuated by said last-named means for moving said brush-carrying unit relative to said selected contact card to wipe the contacts thereon with the brushes of said unit whereby the telephone number defined by the electrical contacts on said selected contact card is automatically dialed.

4. An automatic telephone dialing system comprising, in combination with a telephone dialing circuit and a dial telephone instrument containing leads establishing electrical connections between digital dial contacts of said instrument with said telephone dialing circuit, an adapter socket secured in the bottom of said instrument; said adapter socket containing a plurality of sockets opening to the exterior of said instrument, electrical contacts in said adapter socket electrically connected into said telephone dialing circuit, a connector plug, a plurality of electrical contacts on said plug for engaging the contacts of said socket and establishing electrical connection with said telephone dialing circuit including the digital contacts of said telephone instrument, an electrical by-pass circuit, a contact card, a series of electrical contact areas and electrical insulation areas delineated on said card in a predetermined pattern and defining a specific telephone number, electrical wiping brushes connected into said by-pass circuit, and means for automatically moving said brushes over said predetermined pattern on said card thereby to intermittently make and break said by-pass circuit in accordance with said predetermined pattern on said card and to automatically dial the specific telephone number defined by said pattern.

5. An automatic telephone dialing system, as defined in claim 4, and means for disconnecting and connecting said by-pass electrical circuit from said telephone dialing circuit at will thereby to set the system either for manual dialing from the dial of said telephone instrument or for automatically dialing of a telephone number by the actuation of said last-named means.

6. An automatic telephone dialing system as defined in claim 4, and an endless belt having a plurality of pockets therein for receiving a plurality of said contact cards each having a different predetermined pattern thereon defining a different telephone number, and means for moving said belt to place any selected one of said plurality of contact cards into juxtaposition with said electrical wiping brushes for movement over the pattern on said selected one contact card.

7. An automatic telephone dialing system, as defined in claim 4, and a casing for holding a plurality of said contact cards each having a different predetermined pattern thereon defining a telephone number different from that defined on another card, and a transfer chute movably mounted on said casing for receiving and moving any selected one of said contact cards into juxtaposition with said wiping brushes.

References Cited in the file of this patent

UNITED STATES PATENTS

| | | |
|---|---|---|
| 1,847,061 | Kenerson | Feb. 23, 1932 |
| 2,191,913 | Lewis | Feb. 27, 1940 |
| 2,523,303 | Jason | Sept. 26, 1950 |
| 2,709,001 | Stahl | May 24, 1955 |